United States Patent Office 3,441,396
Patented Apr. 29, 1969

3,441,396
PROCESS FOR MAKING CELLULAR MATERIALS
Dominic D'Eustachio, Pittsburgh, and Howard E. Johnson, Trafford, Pa., assignors to Pittsburgh Corning Corporation, Port Allegany, Pa., a corporation of Pennsylvania
Filed June 3, 1965, Ser. No. 460,997
Int. Cl. C03b 19/08
U.S. Cl. 65—22                            4 Claims

ABSTRACT OF THE DISCLOSURE

This disclosure relates to a process for making lightweight, closed celled cellular bodies from constituents including crystalline silica without first melting the materials and forming a viscous liquid mass. The process includes mixing the finely divided constituents including the crystalline silica and thereafter heating the constituents without liquifaction to a temperature of between 1700° F. and 2300° F. for a sufficient period of time to cause an interaction between the constituents, dissolve a substantial portion of the crystalline material in the mixture and convert substantially all the crystalline silica to a vitreous form of silica. The treated material is then rapidly cooled to prevent recrystallization and comminuted to a relatively fine size. The comminuted, treated material is mixed with a cellulating agent and heated at a controlled rate to a temperature of between 1700° F. and 2000° F. where the admixture coalesces and cellulates to form cellular bodies having physical properties comparable with cellular glass. Various minerals containing crystalline silica, as for example, fly ash and sand, may be used as a raw batch constituent. Fluxing agents and oxidizing agents may also be used in the raw batch.

---

This invention relates to a process for making lightweight cellular bodies and particularly to a method for making lightweight cellular bodies useful as thermal insulation that have improved insulating properties.

Cellular glass thermal insulation has many advantageous features when compared with other types of thermal insulation. Cellular glass is an inorganic closed cell, lightweight material that has a high resistance to fire, moisture, vermin and other objectionable agencies and has desirable insulating properties that make it particularly suitable for use as an insulating material and other useful products. In the past, cellular glass blocks or slabs have been manufactured by pulverizing glass particles containing a substantial amount of sulphates to a relatively fine size. During the pulverizing a cellulating agent such as carbon black or the like is admixed therewith. The finely ground batch is then subjected to an elevated temperature of about 1600° F. for a sufficient period of time to permit the glass particles to soften and cohere. The carbon and sulphate react to produce bubbles of entrapped gas within the cohered mass to form a cellular body. The cellular body is then cooled under controlled conditions to anneal the cellular glass. Cellular glass made according to the above process has an actual density of about 9 lb./ft.$^3$ and thermal conductivity of $k$ factor at a mean temperature of 75° F. of about 0.40 B.t.u./hr./ft.$^2$° F./min. and has been widely used as a thermal insulation.

It has been the aim of the industry to make lightweight cellular bodies having the above desired properties of cellular glass from materials other than pulverized or naturally occurring glass. The manufacture of cellular glass first requires the manufacture of a glass from raw materials. The manufacture of glass is a relatively expensive process and requires heavy capital investments for apparatus such as melting tanks and the like, which melting tanks have to be renewed periodically at very substantial costs. The constituents used to make glass usually comprise silica, lime and soda ash, and such minor ingredients as alumina, potash and borax, which minor ingredients have important effects on the viscosity of the molten glass and the chemical durability of the finished cellular material. The constituents are heated to a temperature of about 2800° F. where a liquid mass is formed. The mass is maintained at this temperature for between 14 and 18 hours to help homogenize the very viscous material. The glass formed by the above process is then cooled, pulverized and used as the basic ingredient in the manufacture of cellular glass bodies. A substantial expenditure is required to first make the glass and thereafter pulverize it to form the pulverized glass starting material for the manufacture of cellular glass.

Processes have been described for expanding volcanic or naturally occurring glass into cellular bodies. For example, U.S. Patent No. 2,946,693 describes a process for admixing $Na_2NO_3$ and NaOH with finely ground, naturally occurring volcanic glass such as Idolite and heating the admixture to a temperature of about 1500° F. where cellulation occurs. The cellular product obtained has both open and closed cells. It is well known that naturally occurring glass such as a volcanic glass has the undesirable property of very low chemical durability and is unsuitable for many uses, primarily because of inadequate chemical composition.

With a naturally occurring glass, the ingredients have been fixed by nature and the processor has little choice in selecting the ingredients to provide the desired properties for the cellular bodies. Where other ingredients are added to the naturally occurring glass to improve its physical properties, it has been the practice to subject the naturally occurring glass to the same melting tank procedure as is used in the conventional manufacture of glass. Diligent searches are continuing for a naturally occurring glass that has the desirable properties, such as chemical durability and the like. There is, therefore, a need for a process to manufacture lightweight cellular bodies having desired properties, such as chemical durability and the like, from readily available, naturally occurring materials.

There have been proposals in the past to prepare lightweight cellular materials from natural nonvitreous minerals comprising primarily $SiO_2$ and $Al_2O_3$. To the best of our knowledge, none of the proposed processes have been used commercially. U.S. Patent #2,485,724, entitled "Method of Making Lightweight Cellular Materials," dated Oct. 25, 1949, and #2,611,712, entitled "Method of Preparing a Cellulated Glass Body," dated Sept. 23, 1952, describe processes for making a cellular material from the naturally occurring minerals that contain silica, aluminum oxide and alkali metal oxides that is naturally occurring fusible glassy and crystalline alkaline-aluminate silicate minerals with compositions in the ranges

|  | Percent |
|---|---|
| $SiO_2$ | 60–77 |
| $Al_2O_3$ | 13–23 |
| Alkali metal oxides | 8–18 |

The process for manufacturing the cellular bodies from the above naturally occurring minerals includes the steps of grinding the minerals to a fine state of subdivision and admixing a cellulating agent such as carbon black, lamp black or the like, therewith. Other gas producing additives such as calcium carbonate and calcium sulphate are suggested. The admixture of the naturally occurring mineral and cellulating agent is introduced into a suitable mold and heated at a controlled rate to a temperature of between 1500–1700° F. where the admixture cellulates and forms a coherent cellular mass. The cellular bodies are thereafter cooled at a controlled rate in an annealing lehr.

The processes described in these patents are single step processes wherein the naturally occurring minerals and cellulating agent are heated to a cellulation temperature of between 1400 and 1900° F. at which temperature the admixture forms a cellular body.

Ford, #2,890,126, describes a process for producing cellular glass from the naturally occurring mineral silica. He suggests the use of silicon carbide as suitable carbonaceous material for reacting with oxides to produce gases for cellulating and show that adding materials such as feldspar and oxides of sodium, aluminum, etc., lowers the viscosity and allows sintering and cellulation to take place more readily.

Although the above processes may produce cellular bodies from naturally occurring minerals, it has been found that it is not possible to produce lightweight cellular bodies having desirable properties from readily available materials such as silica and fly ash. The products obtained by subjecting raw, unprocessed or naturally occurring materials such as silica or fly ash to the above processes, although cellular in appearance, have an irregular cell structure, a relatively high thermal conductivity and a relatively high density so that the product does not compare favorably with cellular glass bodies manufactured from a glass starting material. There remains a need, therefore, for a process to manufacture lightweight cellular bodies having desirable insulating properties from readily available, inexpensive, unprocessed or naturally occurring materials.

We have surprisingly discovered by subjecting the materials to an elevated temperature for a short period of time before the materials are admixed with the cellulating agent, that it is now possible to obtain a lightweight cellular material that has physical properties comparable to the physical properties of cellular glass made from pulverized glass. In the past it has always appeared necessary to raise the temperature of the ingredients used to make the glass to a sufficiently high temperature to form a viscous liquid. In this molten state a very expensive glass tank is required for handling. The high temperature and molten state have been thought necessary to secure the reactions that occur in glassmaking. By the method described in this invention we have surprisingly found that effects equivalent, for the needs of a cellular glass making process, to the reactions occurring in a melting tank, can be made to occur at much lower temperatures provided the materials are properly admixed and comminuted. This greatly simplifies the problem of handling the heated material and results in important economic advantages Thus it is now possible to treat the raw materials without liquefaction and obtain the desirable properties required for subsequent cellulation.

Accordingly, the principal object of this invention is to make lightweight cellular bodies from readily available inexpensive materials by subjecting the materials to an elevated temperature for a preselected relatively short period of time and thereafter admixing the treated materials with a cellulating agent and heating the admixture to a cellulating temperature for a preselected period of time and at the same time have control of the composition of the glass in the finished cellular product, which composition can be varied to adjust the properties of the finished product to meet a specified particular need.

Another object of this invention is to utilize fly ash as one of the primary constituents in the manufacture of the lightweight cellulated bodies.

Another object of this invention is to treat the siliceous raw materials before cellulation to destroy a substantial portion of the crystalline characteristic so that the cellular bodies formed therefrom have an improved thermal conductivity.

These and other objects and advantages of this invention will be more completely disclosed and described in the following specification, the accompanying drawings and the appended claims.

Briefly, the invention comprises admixing and comminuting the unprocessed siliceous crystalline materials to a relatively fine size. The comminuted materials are thereafter heated to an elevated temperature for a sufficient period of time to destroy a substantial portion of the crystalline characteristic of the materials and form a relatively noncrystalline admixture or eutectic. The admixture is thereafter comminuted and admixed with a cellulating agent and subjected to an elevated temperature for a sufficient time to form a cellular body. The cellular body has the desirable properties of a cellular material manufactured from pulverized glass and is useful as a thermal insulation.

For purposes of the present invention various minerals containing crystalline silica may be used as the raw batch constituents. Readily available inexpensive constituents are preferred. For example, it has been discovered that fly ash may be cellulated according to the herein described process to form a lightweight cellular body. Sand, a form of crystalline silica, may also be cellulated according to the herein described process. For certain desirable properties of the cellular body, mixtures of fly ash and crystalline silica, two readily available and inexpensive materials, may be admixed in various proportions and cellulated to form cellular bodies.

Fly ash is the fine ash resulting from the combustion of pulverized coal that is collected in the stacks of conventional power generating plants. A typical composition of fly ash is as follows.

| Constituent: | Parts by wt. |
| --- | --- |
| $SiO_2$ | 51.1 |
| $Fe_2O_3$ | 10.9 |
| $Al_2O_3$ | 29.2 |
| $P_2O_5$ | 0.4 |
| CaO | 1.6 |
| MgO | 0.6 |
| $SO_3$ | 0.5 |
| Loss on ignition at 750° C. | 4.5 |

For convenience, throughout the specification and claims the term "fly ash" will be utilized to designate the ash product of pulverized coal that contains at least some of the above constituents and may be cellulated according to the above described process. The ultimate composition of the fly ash may vary with the type of coals subjected to combustion in the power generating plants. It is believed, however, where the fly ash contains $SiO_2$, $Fe_2O_3$ and $Al_2O_3$ that suitable cellular material may be produced therefrom. It should be understood, however, the invention is intended to encompass formulated or naturally occurring admixtures of $SiO_2$ and metal oxides.

We have found that the proportions of the constituents may be varied and a suitable cellular body obtained by the process herein described. Cellular bodies having physical properties comparable to cellular glass formed from pulverized glass may be obtained with materials set forth below. All proportions are parts by weight unless otherwise indicated.

| Constituent: | Parts by wt. |
| --- | --- |
| Silica ($SiO_2$) | 45–80 |
| $Fe_2O_3$ | 0–2 |
| Sodium carbonate ($Na_2CO_3$) | 10–50 |
| Borax, anhydrous ($Na_2O \cdot 2B_2O_3$) | 0–5 |
| Sodium chloride (NaCl) | 0–1 |

The weight proportions of $SiO_2$ and $Fe_2O_3$ include the $SiO_2$ and $Fe_2O_3$ present in the fly ash constituent. A preferred formulation of the above constituents is as follows.

| Constituent: | Parts by wt. |
| --- | --- |
| Fly ash | 50 |
| Silica ($SiO_2$) | 35 |
| Sodium carbonate ($Na_2CO_3$) | 15 |
| Borax, anhydrous ($Na_2O \cdot 2B_2O_3$) | 1 |
| Sodium chloride (NaCl) | 0.5 |

The weight proportion of silica does not include the ($SiO_2$) present in the fly ash.

Figure 1:
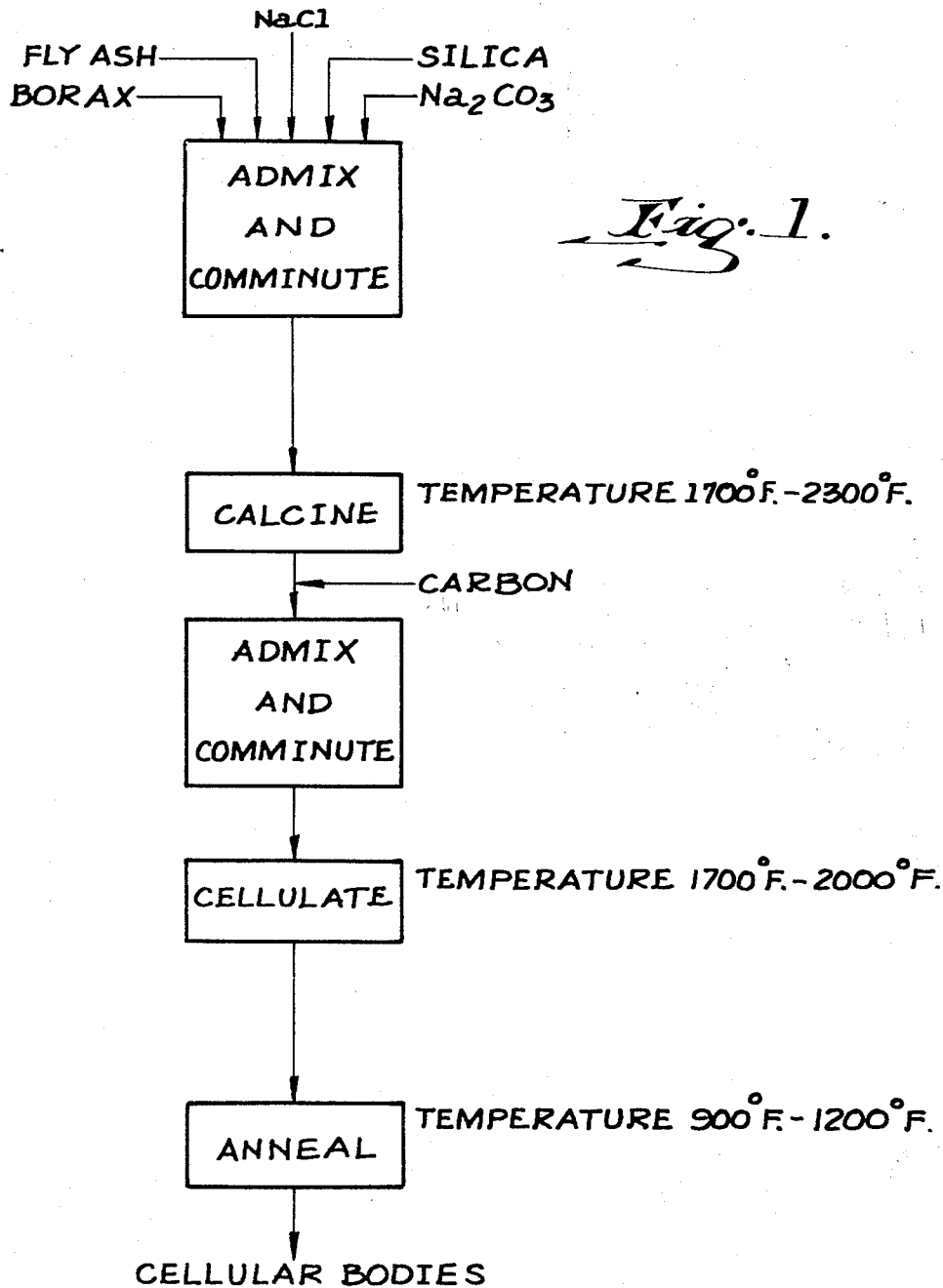
FIGURE 1 is a block diagram of the process of the present invention.

Referring to FIGURE 1, the process for making a cellular body from the above constituents may be practiced by thoroughly admixing the finely divided constituents in a mixing zone. The mixture is thereafter calcined at a temperature of between 1700° F. and 2300° F. for a sufficient period of time to cause an interaction between the constituents and dissolve a substantial portion of the crystalline material in the admixture. At the temperature selected for this interaction the mass of material is not molten in the conventional glass sense and can be handled in a rotary kiln instead of the much more expensive and much slower conventional glass tank method. The length of time the admixture is calcined is dependent on the temperature at which the material is calcined. For example, at 2300° F. sufficient interaction should occur in a period of about ten minutes. After the admixture is calcined for the desired period it is cooled at a relatively rapid rate to prevent recrystallization.

At a temperature below 700° F. the calcined material is thereafter comminuted to a relatively fine size and is admixed with between 0.1 and 0.5 part by weight carbon in the form of carbon black, lamp black or other forms of carbonaceous material that react with an oxygen liberating agent to form a gas. It should be noted that the fly ash contains a small amount of carbon in the form of carbonized coal that contributes to the cellulation process as a cellulating agent. The admixture of the calcined constituents and carbon are thoroughly admixed and thereafter heated at a controlled rate to a temperature between 1700° F. and 2000° F. At this elevated temperature the admixture coalesces and the cellulating agent reacts to form a cellular body. The cellular body is thereafter annealed at a temperature of between 900° F. and 1200° F. for a sufficient period of time to relieve the stresses in the material forming the cell walls. The cellular bodies so produced have physical properties comparable with cellular glass made from a pulverized glass starting material.

It should be understood that the constituents may be calcined in any suitable type of apparatus as, for example, a rotary kiln, an endless metal belt or other well-known calciners. The calcined admixture may thereafter be cellulated in a conventional manner wherein the calcined material admixed with carbon is placed in a mold and heated to the cellulation temperature in a conventional furnace. The cellulated bodies may thereafter be removed from the molds and annealed in a conventional annealing lehr. A number of processes have been proposed for continuous cellulation of cellular glass. This invention can also be practiced in conjunction with any of these proposed processes.

Figure 2:
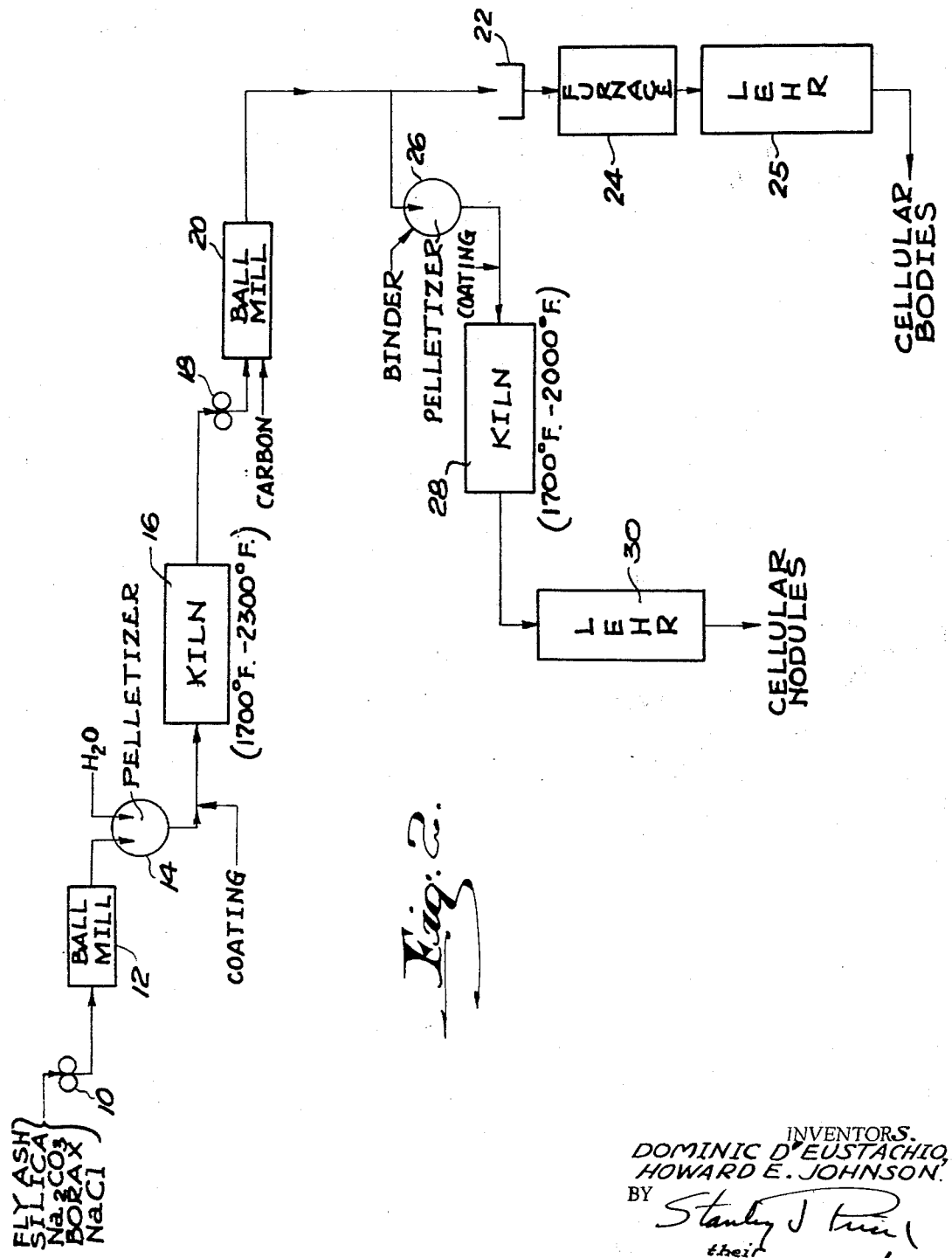
FIGURE 2 is a flow diagram illustrating a method of making the improved cellular bodies.

In FIGURE 2 there is illustrated schematically a flow diagram wherein pellets of the raw constituents are calcined in a rotary kiln. The materials, as for example, 50 parts by weight fly ash, 35 parts silica, 15 parts sodium carbonate, 1 part borax and 0.5 part sodium chloride are first comminuted in a conventional crusher 10 so that all of the particles pass through a 200 mesh Tyler Standard screen and about 90 percent by weight pass through a 325 mesh Tyler Standard screen. The length of time required to calcine the raw constituents is dependent upon their particle size. Within limits, the calcining of the raw constituents can be accelerated by comminuting the raw constituents to a fine size. The comminuted constituents are thereafter fed to a ball mill 12 where they are thoroughly admixed and the admixture is pelletized in a conventional pelletizer 14 using a suitable binder such as water or the like. By dampening the admixture with water suitable pellets having a size capable of passing through an 8 mesh Tyler Standard screen and being retained on a 16 mesh Tyler Standard screen are obtained. The size of the pellets formed in pelletizer 14 is not critical; however, larger pellets require a longer residence time in the calciner to lose their crystalline character. The pellets are coated with a suitable parting agent, as for example, $Al_2O_3 \cdot 3H_2O$.

The coated pellets are thereafter fed to a rotary kiln and heated to a temperature of between about 1700° F. and 2300° F. The residence time within the kiln 16 is dependent on the temperature within the kiln and the size of the pellets; for example, where the pellets having a size between 8 and 16 mesh are heated to a temperature of 1700° F. it has been found that approximately one hour residence time is required to cause the desired change in the silica crystals. Where pellets of the same size are subjected to a temperature of 2300° F. it has been found that a residence time of 10 minutes is adequate to cause the desired change in the silica crystals.

The calcined pellets have a bulk density of about 35 pounds and an actual density of 58 p.c.f. The actual density of the pellets indicates that some cellulation or air entrapment has occurred within the calcining kiln 16. It is believed that the carbon present in the fly ash serves as a cellulating agent to partially cellulate the pellets during calcining in the kiln 16. The partially cellulated pellets have a high actual density and, although useful where thermal conductivity and density are not major factors, e.g., as a filler for concrete, their physical properties do not compare favorably with cellular bodies made from pulverized glass, where the properties normally associated with currently commercially produced cellular glass are desired.

The calcined partially cellulated pellets are thereafter crushed in a conventional crusher 18 to a size capable of passing through a 16 mesh Tyler Standard screen. Between 0.1 and 0.5 part by weight of the carbon in the form of granules are mixed with the comminuted calcined pellets in a conventional ball mill 20 and comminuted to a size capable of passing through a 325 mesh Tyler Standard screen. It is preferable that the admixture of carbon and calcined pellets be comminuted to a size of between 5 and 8 microns. The comminuted admixture from ball mill 20 may thereafter be introduced into conventional heat resistant molds 22 and cellulated in a furnace 24 at a temperature of between 1700° F. and 2000° F. to form buns or blocks of cellular material. The buns are thereafter annealed in a lehr 25 to relieve the stresses in the cellular material.

The admixture from ball mill 20 may be pelletized in a conventional pelletizer 26 utilizing any suitable binder. It has been found where sodium silicate is utilized as the binder and the pellets are coated with an $Al_2O_3 \cdot 3H_2O$ parting agent that a durable refractory skin may be obtained on the cellular bodies. The coated pellets formed in pelletizer 26 are then cellulated in a rotary kiln 28. The pellets are subjected to a temperature of between 1700° F. and 2000° F. for a period of between 10 minutes and one and one-half minutes. The residence time of the pellets within the kiln 28, for desired cellulation, depends on the size of the pellets. As the size of the pellet increases, the residence time within the cellulating kiln 28 also increases. It has been found that at a temperature of about 1900° F. the pellets will cellulate satisfactorily at a residence time of between 2 and 3 minutes. The cellular nodules formed within the cellulating kiln 28 are thereafter introduced into a cooling lehr 30 where the cellular nodules are cooled without thermal shock.

The cellular bodies, in this instance cellular nodules, have an actual density of between 10 and 15 p.c.f. and a bulk density of between 6 and 9 p.c.f. The cellular bodies formed either as nodules in the cellulating kiln 28 or as blocks in the furnace 24 have small, regular cells and a $k$ factor of about 0.40 and an actual density of between 10 and 15 p.c.f. The above physical properties are comparable to the physical properties of cellular bodies made from pulverized glass. The cellular glass nodules and a process for making the glass nodules is described and claimed in copending application Ser. No. 297,023, entitled "Cellular Glass Nodules."

The following examples are illustrative of the instant invention.

EXAMPLE I

A batch comprising 50 parts by weight fly ash, 35 parts by weight silica, 15 parts by weight sodium carbonate, 1 part by weight anhydrous borax, and 0.5 part by weight sodium chloride were ground in a ball mill for two hours. An X-ray diffraction analysis was made on the admixed constituents. The diffractometer method is used under the following conditions: CuKx, 35 kv., 17 ma. The X-ray diffraction pattern had peaks of the following indices, $d$-spacing and relative intensity.

Figure 3:
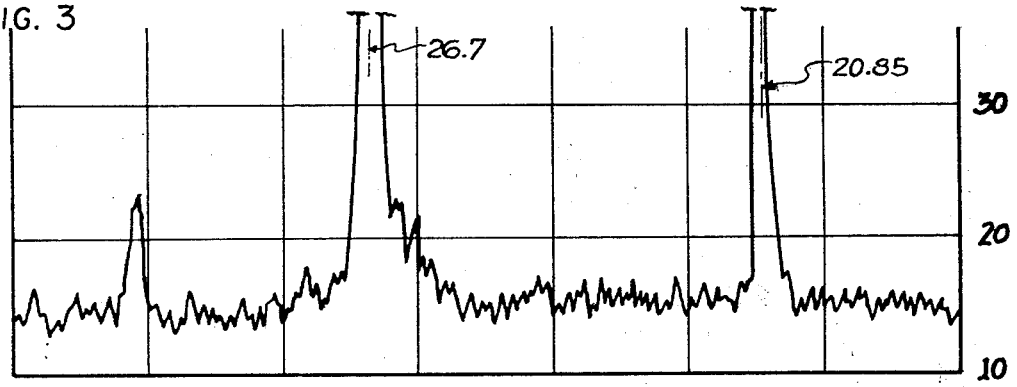
FIGURE 3 is a trace of an X-ray diffraction pattern of the unpossessed materials used to make a cellular material by the process herein illustrated and described.

The X-ray diffraction pattern, a portion of which is reproduced in FIGURE 3, clearly illustrates the presence of alpha quartz crystals in the raw constituents by peaks of their indicated intensity at the following indices.

| Indices 2θ angles | d spacing Angstroms | Intensity |
|---|---|---|
| 20.85 | 4.26 | 42 |
| 26.67 | 3.38 | 85 |
| 50.15 | 1.82 | 29 |

The raw batch was then separated into two equal samples, designated Sample A and Sample B. To Sample A 0.2 part by weight carbon were added and the admixture was thoroughly milled and comminuted for four additional hours. The milled admixture of Sample A had an average size consisting of between 5 and 8 microns. The milled admixture of Sample A was introduced into a mold and the material was heated to an equilibrium temperature of 1500° F. After equilibrium was attained the admixture was heated at a rate of about 17° F. per minute to a cellulating temperature of 1960° F. and maintained at this temperature for five minutes. The cellulating cycle, after an equilibrium temperature of 1500° F. was reached, comprised about 52 minutes. The cellulated sample was thereafter placed in an annealing oven at a temperature of 900° F. and gradually cooled to room temperature in about 16 hours.

Figure 4:
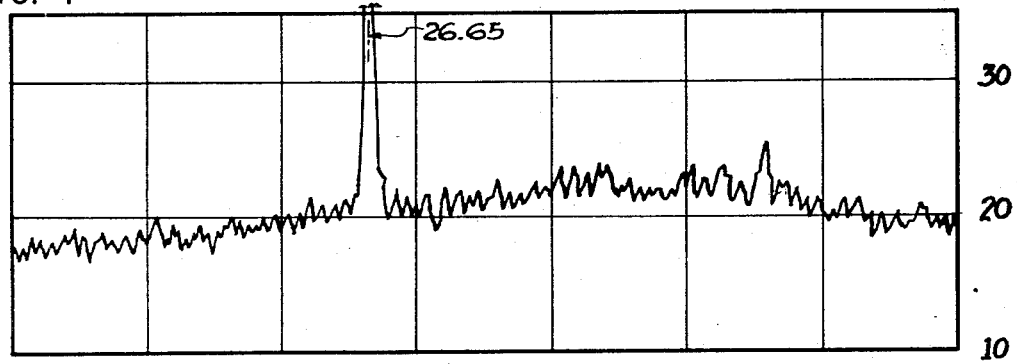
FIGURE 4 is a trace of an X-ray diffraction pattern of a cellular body formed by subjecting an admixture of the unprocessed materials and a cellulating agent to a cellulating temperature.

The product obtained from Sample A that was directly cellulated without being calcined had large irregular cells with many holes between the cells. The wall sections between the cells. The wall sections between the cells were relatively thick. The cellulated product had a high actual density of 24.6 p.c.f., the thermal conductivity was measured at a mean temperature of 85.53° F. and the product had a $k$ factor of 0.707 B.t.u./hr./f.²/° F./in. An X-ray diffraction analysis of cellular Sample A was made, and a portion of the pattern is reproduced as FIGURE 4. Peaks were observed at the following indices with an intensity as indicated in the following table.

| Indices 2θ angles | d spacing Angstroms | Intensity |
|---|---|---|
| 20.85 | 4.26 | 4 |
| 26.65 | 3.34 | 16 |
| 50.15 | 1.82 | 4 |

The X-ray diffraction pattern of Sample A clearly illustrated the presence of alpha quartz crystals. It is believed that a high temperature interaction, such as occurs in a conventional glass melting operation, is necessary before the mixture can be caused to cellulate properly. Clearly, unless the material forming the cell walls of the the cellular mass is reasonably glassy (as opposed to crystalline) the cell walls cannot form properly during the bloating stage.

Figure 5:
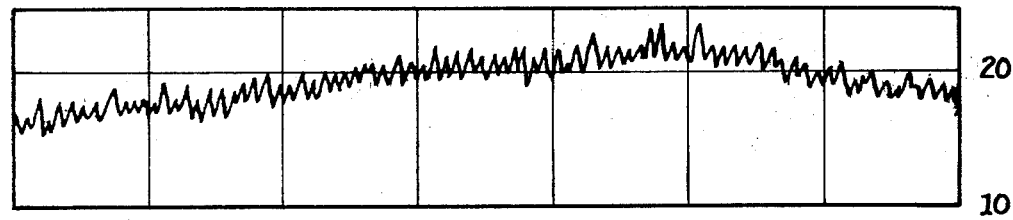
FIGURE 5 is a trace of an X-ray diffraction pattern of the unprocessed materials after they have been calcined at an elevated temperature to destroy the crystalline properties of the raw materials.

Sample B was further ground for four hours and calcined for one hour at a temperature of 2300° F. An X-ray diffraction analysis of the calcined product was made under substantially the same conditions as the X-ray diffraction analysis of the starting material and Sample A. As is illustrated in FIGURE 5, the following peaks were observed.

| Indices 2θ angles | d spacing Angstroms | Intensity |
|---|---|---|
| 41.4 | 2.18 | 2 |
| 44.7 | 2.03 | 8 |

The X-ray diffraction analysis of Sample B after it was subjected to calcining indicates the alpha quartz crystals have disappeared and it is believed that a eutectic of the constituents is formed even though the material has not been melted as normally understood by those skilled in the glass making art.

The physical appearance of the calcined material, however, was similar in many respects to the cellulated product of Sample A in that there were large cells and thick wall sections.

Figure 6:
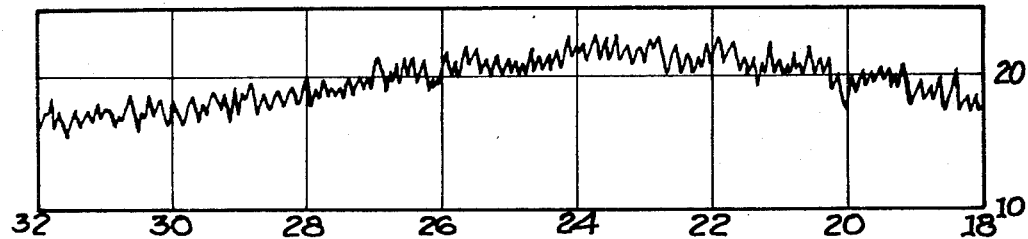
FIGURE 6 is a trace of an X-ray diffraction pattern of a cellular body manufactured according to the herein described invention.

Calcined Sample B was thereafter comminuted to a size capable of passing through an 8 mesh Tyler Standard screen and .175 part by weight carbon added thereto. The admixture was thereafter milled for six hours until the particles had a size of about 5 microns. The milled calcined Sample B was thereafter placed in a mold and subjected to the same heating cycle as Sample A and cellulated according to the cellulating cycle at the same temperatures for the same period of time. The cellulated product, i.e., Sample B, first calcined and then cellulated, had small, regular cells with relatively thin wall sections, an actual density of 11.2 p.c.f. and a thermal conductivity measured at a mean temperature of 85.74° F. of 0.419 B.t.u./hr./ft.²/° F./in. An X-ray diffraction analysis was made of the cellular product under the same conditions as the previous X-ray diffraction analysis. The X-ray pattern reproduced as FIGURE 6 indicates the following peak at an indices of 44.7. Significantly no peaks were present at indices of 20.85, 26.65 and 50.15. The X-ray diffraction analysis clearly indicated the alpha quartz crystals are not present in the materials.

EXAMPLE II

A 100 gram batch comprising 90 parts by weight fly ash, 10 parts by weight $Na_2CO_3$, 2 parts by weight anhydrous borax, 0.5 part by weight sodium chloride were ground in a ball mill for about two hours and thereafter calcined at a temperature of 2000° F. for about two hours and twenty minutes. The calcined material was admixed with 0.2 part by weight carbon and milled for approximately six hours. A 1 gram sample of the admixture was cellulated at 1950° F. for five minutes. The cellular product had a density of about 10 p.c.f. and estimated $k$ factor of .41 B.t.u./hr./ft.²/° F./in. The cells were uniform with relatively thin wall sections.

EXAMPLE III

A 100 gram batch comprising 75 parts by weight $SiO_2$, 20 parts by weight $Na_2CO_3$, 3 parts by weight anhydrous borax, 0.5 part by weight NaCl, 2 parts by weight $Fe_2O_3$, were subjected to substantially the same milling operation as Example II and calcined at a temperature of about 2300° F. for approximately one hour at 2300° F. The calcined material was admixed with 0.2 part by weight carbon and milled for a period of about three hours and thereafter cellulated at a temperature of 1750° F. for about five minutes. The cellular product had a density of about 14 p.c.f. and an estimated thermal conductivity of about .45 B.t.u./hr./ft.$^2$/° F./in.

The following table sets forth batch constituents, operating conditions, and properties of the resulting cellular product.

| Sample | Run #1 | Run #2 | Run #3 | Run #4 | Run #5 | Run #6 | Run #7 | Run #8 | Run #9 | Run #10 |
|---|---|---|---|---|---|---|---|---|---|---|
| Fly ash | 10 | | 50 | 50 | 60 | 65 | 70 | 80.7 | 85 | 50 |
| Sand | 70 | 75 | 35 | 35 | 25 | 15 | 15 | 4.7 | | 25 |
| $Na_2CO_3$ | 20 | 20 | 15 | 15 | 15 | 20 | 15 | 14.6 | 15 | 25 |
| Borax, anhydrous | 2 | 3 | 2 | | 2 | 2 | 2 | 2 | 2 | |
| Salt, NaCl | 0.5 | 0.5 | 0.5 | 0.5 | 0.5 | 0.6 | 0.5 | 0.5 | 0.5 | 0.5 |
| Other ($Fe_2O_3$) | 2 | 2 | | | | | | | | |
| Milled—time (min.) | 120 | 120 | 105 | 120 | 120 | 120 | 120 | 120 | 120 | 33 33 |
| Calcined time (min.)/temp. (° F.) | 75/2,300 | 75/2,300 | 30/1,800 45/2,000 | 60/2,000 | 120/2,000 | 120/2,000 | 120/2,000 | 120/2,000 | 120/2,300 | 60/1,700 |
| Carbon [1] | 0.2 | 0.2 | 0.2, 0.4 | 0.2, 0.3, 0.4 | 0.2 | 0.2 | 0.2 | 0.2 | 0.2 | 0.2 |
| Other [1] ($Al_2O_3 \cdot 3H_2O$) | | 4 | | | | | | | | |
| Milled—time (hr.) [3] | 6 | 6 | 6 | 6 | 6 | 18 | 6 | 6 | 6 | 6 |
| Cellulated time (min.)/temp. (° F.) [2] | 5/1,900 | 5/1,750 | 15/1,800 | 10/1,850 | 10/1,750 | 15/1,750 | 20/1,750 | 15/1,800 | 15/1,850 | 10/1,800 |
| Density—p.c.f. | 14 | 11 | 10 | 11 | 10 | 11 | 8 | 8 | 9 | 12 |
| Cellular Structure | Good | Good | Good | Good | Good | Good | Good | Good | Good | Good |

[1] Mill addition; Micronex W6 unless otherwise noted.
[2] 1 gram samples cellulated in carbon crucible.
[3] Mill calcined materials.

Although we do not wish to be bound by the following theory, we believe that the previously described process makes it possible to obtain a cellular product having the desirable density and thermal conductivity because the batch constituents are first subjected to an elevated temperature for a relatively short period of time so that the alkali metal in the admixture melts and is in intimate contact with the alpha quartz crystalline material. A substantial portion of the alkali metal bearing material reacts with the alpha quartz crystalline material to produce either sodium oxide or sodium silicate or both. A substantial portion of the alpha quartz crystalline material as such is destroyed by this first heating step and goes into solution as a glassy material. For purpose of this specification the alpha quartz crystalline material may be defined as crystalline silica and the glassy material as vitreous silica. The amount of the alpha quartz crystalline material that goes into solution in the first heating step is, it is believed, indicative of whether a sufficient amount of the glassy phase is formed and whether the alkali bearing material is in sufficiently intimate contact with the siliceous material. Thus, where a substantial portion of the alpha quartz crystalline material goes into solution and forms a glassy material it has been found that it is possible to thereafter obtain a cellular material of desired density and thermal conductivity by further heating the treated material in the presence of a cellulating agent. Where the cellulating agent is initially admixed with the batch constituents and the admixture is heated to a cellulating temperature, it has been discovered that it is not possible to control the cellulation of the material. It appears where the raw batch constituents are admixed with the cellulating agent and heated to an elevated temperature that uncontrolled cellulation occurs in a narrow temperature range and the cells formed in the material have a spectrum of sizes including a substantial number of large cells.

It is believed that the sodium carbonate serves two purposes in the cellulation process. As a fluxing agent it aids in the melting of the other constituents and provides the alkali metal that combines with the silicate material to lower the melting point of the admixture. The sodium carbonate also serves to increase the temperature range at which the material may be cellulated. Without the sodium carbonate the material would have a very narrow cellulating range, whereas by including sodium carbonate the admixture may be cellulated at a temperature between 1700° F. and 2000° F. Although $Na_2CO_3$ is a preferred fluxing material because it is inexpensive and readily available, it should be understood that other fluxing materials such as $K_2CO_3$ may also be used. The sodium chloride serves as an accelerator and melts at a lower temperature than the sodium carbonate and accelerates placing the constituents in solution. The anhydrous borax also serves as a fluxing agent and improves the durability of the glass. Both sodium chloride and borax improve the qualities of the cellular material. As illustrated in the examples, however, a suitable cellular product may be obtained without including these constituents.

It is believed any suitable carbonaceous cellulating agent may be used such as carbon black, lamp black, finely powdered coal, carborundum or the like. From an economic standpoint finely divided carbon black is preferred.

The admixture to be cellulated should also contain an oxidizing producing agent such as ferric oxide, antimony trioxide, arsenic trioxide, nickel oxide, manganese dioxide and others that are reduced at elevated temperatures by carbon to liberate oxygen containing gases as is well known in the art of cellulating glass.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. A method of producing a cellular body from a material containing quartziferous silica which comprises,
   (a) Admixing a composition comprising the following ingredients in approximately the weight proportions given:

|  | Parts by Wt. |
   |---|---|
   | (1) Quartziferous silica ($SiO_2$) | 45–80 |
   | (2) An alkali metal salt fluxing agent | 10–50 |
   | (3) An oxygen producing agent reducible by carbon | 1–10 |

(b) treating said composition by heating without liquifaction to dissolve a substantial portion of the quartziferous silica and to convert substantially all of said quartziferous silica to a vitreous form of silica to substantially reduce the intensity of the quartziferous silica X-ray diffraction pattern peaks by at least ½ their former intensity at indices of 4.26 Angstroms and 3.34 Angstroms,
   (c) intimately admixing a carbonaceous cellulating agent with said treated composition,
   (d) heating said admixture of said treated composition and said carbonaceous cellulating agent to a temperature of between 1700° F. and 2000° F. for a sufficient period of time to cellulate said admixture and form a cellular body having a desinty less than about 24 lb. per cubic foot, and (e) cooling and annealing said cellular body.

2. A method of producing a cellular body from a material containing quartziferous silica having X-ray diffraction pattern peaks of substantial intensity at indices of about 4.26 Angstroms and 3.34 Angstroms which comprises, (a) admixing a composition comprising the following ingredients in approximately the weight proportions given:

|  | Parts by wt. |
|---|---|
| (1) Quartziferous silica | 45–80 |
| (2) Alkali metal salt fluxing agent | 10–50 |
| (3) An oxygen producing agent reducible by carbon | 1–10 |

(b) heating said composition at a temperature of between 1700° F. and 2300° F. for a sufficient period of time and less than 10 hours without liquifaction to dissolve a substantial portion of the quartziferous silica and to substantially reduce the intensity of said quartziferous silica X-ray diffraction pattern peaks by at least ½ their former intensity at indices of 4.26 Angstroms and 3.34 Angstroms, (c) cooling said composition at a sufficiently rapid rate so that the intensity of said quartziferous silica X-ray diffraction pattern peaks at indices of 4.26 Angstroms and 3.34 Angstroms remain at an intensity of at least less than ½ their original intensity, (d) intimately admixing a carbonaceous cellulating agent with said cooled composition, (e) heating said admixture of said cooled composition and said carbonaceous cellulating agent to a temperature of between 1700° F. and 2000° F. for a sufficient period of time to cellulate said admixture and form a cellular body having a density of less than about 24 lb. per cubic foot, and (f) cooling and annealing said cellular body.

3. A method of producing a cellular body which comprises, (a) admixing a composition comprising the following finely ground ingredients in approximately the weight proportions given:

|  | Parts by wt. |
|---|---|
| (1) Fly ash | 0–90 |
| (2) Quartziferous silica ($SiO_2$) | 45–80 |
| (3) A fluxing agent selected from the group consisting of alkali metal carbonates, alkali metal borates, alkali metal chlorides and mixtures thereof | 10–50 |
| (4) Oxygen producing agent reducible by carbon | 1–5 | in which the weight proportions of quartziferous silica and the oxygen producing agent include the silica and oxygen producing agent present in the fly ash ingredient, (b) heating the mixture to a temperature of between 1700° F. and 2300° F. for a period of less than 10 hours without liquifaction to dissolve a substantial portion of the quartziferous silica and to substantially reduce the intensity of the quartziferous silica X-ray diffraction pattern peaks by at least ½ their former intensity at indices of 4.26 Angstroms and 3.34 Angstroms, (c) cooling the mixture at a sufficiently rapid rate to maintain the admixture substantially free of quartziferous silica, (d) thereafter intimately admixing a carbonaceous cellulating agent with said mixture and obtaining a second admixture, (e) heating said second admixture to a temperature of between 1700° F. and 2000° F. for a sufficient period of time to cellulate said admixture and form a cellular body having a density below about 24 lb. per cubic foot, and (f) cooling and annealing said cellular body.

4. A process for forming a cellular body comprising admixing pulverulent raw materials including quartziferous silica in amounts which if melted to a liquid state would form a glass which comprises, (a) comminuting said admixture to a size capable of passing through a 200 mesh Tyler Standard screen, (b) wetting said comminuted admixture with a liquid binder, (c) forming pellets of said wetted admixture, (d) coating said pellets with a parting agent to prevent said pellets from adhering to each other when heated to an elevated temperature, (e) heating said pellets without liquifaction in a rotary furnace at a temperature of between 1700° F. and 2300° F. for a sufficient period of time to dissolve a substantial portion of the crystalline silica and to substantially reduce the intensity of the quartziferous silica X-ray diffraction pattern peaks by at least ½ their former intensity at indices of 4.26 Angstroms and 3.34 Angstroms, (f) cooling said pellets to a temperature of below 700° F., (g) comminuting said pellets to form particles having a size capable of passing through a 16 mesh Tyler Standard screen, (h) intimately admixing a carbonaceous cellulating agent with said particles, (i) comminuting said particles and said carbonaceous cellulating agent to a size capable of passing through a 325 mesh Tyler Standard screen, (j) thereafter heating said comminuted particles and cellulating agent at a temperature of between 1700° F. and 2000° F. for a period of time sufficent to cellulate said admixture and form a cellular body having a density of less than about 24 lbs. per cubic foot, and (k) cooling and annealing said cellular body.

References Cited

UNITED STATES PATENTS

| 1,898,839 | 2/1933 | Kern | 65—22 |
| 2,466,001 | 4/1949 | Burwell | 65—22 |
| 3,207,588 | 9/1965 | Slayter et al. | 65—22 XR |
| 3,325,264 | 6/1967 | Marceau | 65—22 |
| 3,321,414 | 5/1967 | Vieli | 65—20 |

DONALL H. SYLVESTER, *Primary Examiner.*

F. W. MIGA, *Assistant Examiner.*

U.S. Cl. X.R.

65—18, 20, 29; 106—47